Feb. 8, 1955 H. L. MILLS 2,701,635
STORAGE FILE FOR PHOTOGRAPHIC SLIDES
Filed Feb. 12, 1953
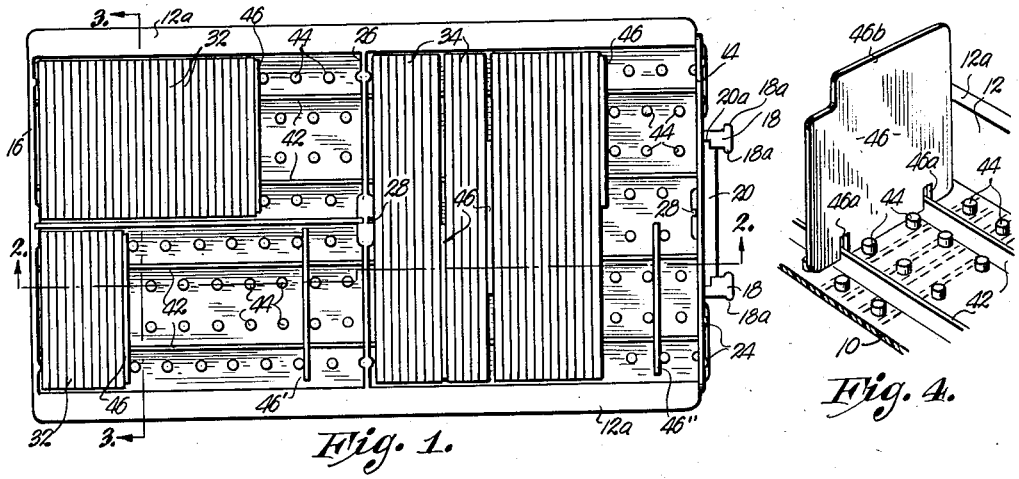
Fig. 1.
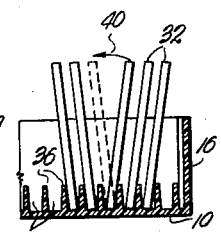
Fig. 4.
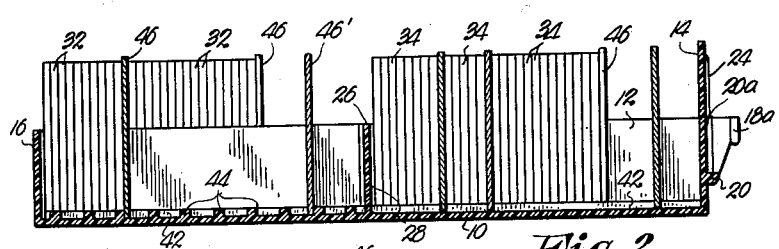
Fig. 2.
Fig. 6.
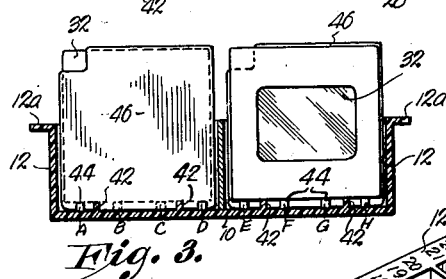
Fig. 3.
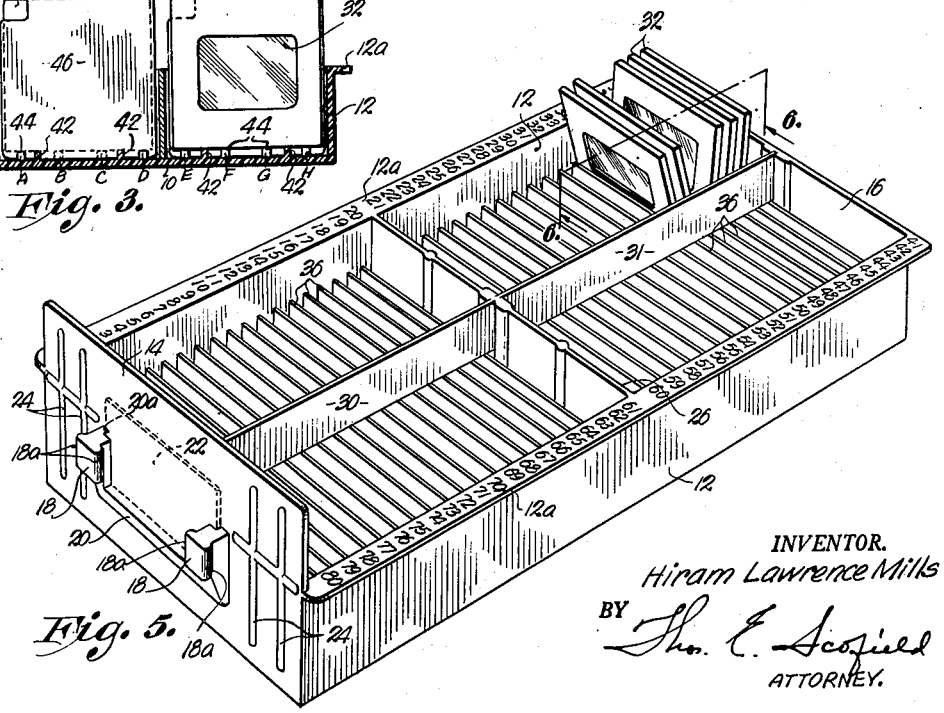
Fig. 5.
INVENTOR.
Hiram Lawrence Mills
BY
Thos. E. Scofield
ATTORNEY.

United States Patent Office 2,701,635
Patented Feb. 8, 1955

2,701,635

STORAGE FILE FOR PHOTOGRAPHIC SLIDES

Hiram Lawrence Mills, Prairie Village, Kans.

Application February 12, 1953, Serial No. 336,589

1 Claim. (Cl. 206—73)

The present invention relates in general to the storage of slides or photographic transparencies; and it deals more particularly with a novel filing tray or drawer for such slides.

An object of the invention is to provide a filing tray or drawer which is adapted to receive slides of different size, its arrangement being such that part of the storage space therein may be utilized for "single width" slides, such as those obtained in conventional 35 mm. photography, while another part is used for "double width" slides, such as are obtained in stereo photography; or, if desired, the space may be utilized entirely for one or the other of said sizes, making for complete flexibility in the application of the tray to the needs of any user.

Another object is to provide a tray of the character indicated which is designed to permit filing and indexing of slides on a "group selection" basis, wherein the slides are grouped according to subject matter and the separate groups, rather than the individual slides within any group, are indexed. In connection with this, another important object is to provide a novel and very flexible indexing arrangement which permits grouping of slides without imposing any arbitrary limitation upon the number of slides in any individual group; thus, whether the individual groups in the tray contain a small or large number of slides, whether the various groups are uniform or non-uniform in size, the filing and indexing is accomplished with exceptional efficiency, and maximum use is made of all available space within the tray.

A correlative object is to provide a tray designed to satisfy the needs of those users who prefer to file and index slides on an "individual selection" basis so that any desired single slide can be located easily without disturbing the others that are stored therewith. A feature in connection with the latter arrangement resides in the provision of a permanent indexing system that is carried on laterally projecting flanges at opposite sides of the tray, these flanges having a dual purpose in that they also serve as supporting slides to permit mounting of the tray as a drawer in an open front cabinet.

A further object is to provide on my tray an attractive escutcheon comprising an efficient drawer pull so integrated with a holding frame for an index card or label that it protects the latter, each performing its desired function without in any way interfering with the other desipite the compact organizaion of the two.

Still another object is to provide a tray of the character indicated having the features outlined above, which is economical to manufacture yet strong, durable and dimensionally stable, as well as being neat and attractive in appearance.

Other and further objects of the invention, together with the features of novelty whereby the objects are achieved, will appear in the course of the following description.

In the accompanying drawings which form a part of the specification and are to be read in conjunction therewith, and in which like reference numerals are employed to indicate like parts of the various views:

Fig. 1 is a plan view of one form of my slide filing tray, showing the forward portion thereof partially loaded with double length "stereo" slides and the rear portion partially loaded with 35 mm. transparencies bound in standard 2 x 2 inch frames;

Fig. 2 is a longitudinal cross section taken along the line 2—2 of Fig. 1 in the direction of the arrows;

Fig. 3 is a transverse cross section taken along the line 3—3 of Fig. 1 in the direction of the arrows;

Fig. 4 is a fragmentary perspective view of a portion of the same tray showing one of the indexing dividers slightly elevated from its normal position for purposes of illustration;

Fig. 5 is a perspective view showing an alternative form of my slide filing tray; and Fig. 6 is a fragmentary cross section taken along the plane 6—6 of Fig. 5 in the direction of the arrows.

Except for specific differences in the configuration of the inside bottom, the tray shown in Figs. 1 to 4 is identical to that illustrated in Figs. 5 and 6 and a single description will suffice for both.

Thus it will be seen that the exterior shell of the tray comprises a flat bottom 10 (disregarding the interior surface thereof for the moment) with upstanding side walls 12, a forward wall 14 and a rear wall 16. Each side wall has a narrow outwardly projecting flange or lip 12a extending longitudinally thereof along its upper edge; and the height of the rear wall is such that its upper edge is flush with the two flanges. The forward wall is almost double the height of the side and rear walls, as can be best seen in Figs. 2 and 5.

As will readily be understood by those versed in the art, flanges 12a are adapted to be received in suitable horizontal grooves or tracks in the opposite inside walls of a conventional open-front storage cabinet (not shown) whereby the tray can slide into and out of the cabinet like a drawer.

A drawer pull is provided on the front of the tray, this comprising a pair of outwardly projecting laterally spaced knobs 18 which are formed integrally with the upstanding leg portions of a U-shaped frame 20 to form an attractive central escutcheon. The legs of the frame 20 are vertically grooved as illustrated at 20a to receive opposite edges of an index card 22 (shown dotted in Fig. 5) on which may be placed any desired indicia or legend relative to the contents of the tray. This information is of course clearly visible at all times between the knobs 18, and the knobs serve to protect the card from accidental injury due to brushing contact therewith.

Each knob has at its outermost extremity an enlarged head formed by opposite vertical ribs or beads 18a which make the knob generally T-shaped in horizontal cross section. Thus either knob may be grasped between the thumb and forefinger in order to slide the drawer into or out of the storage cabinet as mentioned hereinbefore; alternatively, both knobs may be grasped simultaneously with one hand by placing the thumb on the outside rib of one knob and the forefinger on the outside rib of the other.

On either side of the drawer pull assembly just described, the front wall of the tray has integral H-shaped bosses 24 which are for decorative purposes and at the same time serve to reinforce and strengthen the wall.

Midway between the forward and rear walls 14 and 16, I provide a permanent partition 26 whose upper edge is flush with the flanges 12a on the side walls. The partition is thickened at its center, and the forward and rear walls are similarly thickened by inwardly projecting central bosses; these thickened regions contain vertical slots or grooves 28 adapted to receive the ends of removable longitudinal dividers 30 and 31.

With both of the latter dividers in place (see Fig. 5), the tray is divided into four equal sections, each section being just wide enough to accommodate standard 2 x 2 inch bound slides 32 standing in a generally upright position. However, with dividers 30 and 31 removed, the full width of the tray is available for receiving standard "stereo" slides such as 34, which are approximately double the width of the slides 32; alternatively, as shown in Figs. 1 and 2, slides of the two different sizes can be filed in the same tray, if desired, simply by removing one of the longitudinal dividers and leaving the other in place.

Having now described the features and details of construction that are common to both embodiments of my slide filing tray, it will be convenient to consider the differing configuration of the inside bottom of the respective units. The arrangement shown in Figs. 5 and 6 is preferable if it is desired to index and catalog the slides in- dividually, identifying each independently of the others for the highest degree of selectivity; the arrangement of Figs. 1 to 4 is preferable, on the other hand, if it is desired to index the slides by groups rather than singly, the slides of each group relating collectively to a common subject.

Referring, then, to Figs. 5 and 6, I provide on the bottom 10 of the tray a series of integral upstanding ribs or fins 36 extending crosswise of the tray from one side wall to the other. The ribs are parallel to one another and equally spaced along the length of the tray, each tapering slightly from its base to its upper edge as shown in Fig. 6. The groove or pocket 38 between adjacent ribs is of sufficient depth to receive approximately the lower one-fifth of a slide 32; and of sufficient width to receive the thickest slides encountered in practice and allow same some play in the groove.

The depth and width of the slide pockets is important in that it insures that the slides will be held generally upright in the respective pockets, yet permits the top edge of each to swing forwardly or rearwardly through a limited arc as indicated by the arrow 40 (Fig. 6). This facilitates separating the slides at their upper edges at any point along the length of the tray for the purpose of scanning legends printed along the upper margins of the individual slides, and it also allows space for insertion of one's fingers between slides for the purpose of grasping and removing any selected slide from the tray.

As will be seen from Fig. 5, the lower edges of the dividers 30 and 31 rest on the upper edges of the ribs 36 when the dividers are in place. Also it will be noted from this figure that slides filed in the tray are individually identified by a serial numbering system on the upper faces of flanges 12a, each consecutive number appearing directly above one of the slide pockets 38. When dividers 30 and 31 are used and single width 35 mm. slides are filed in the tray, the numbers on both flanges are used for indexing purposes, but if double width "stereo" slides are filed therein (dividers 30 and 31 being removed), it will be understood that the numbers on only the left-hand flange are utilized.

Turning to the embodiment shown in Figures 1 to 4, it will be observed that inasmuch as the slides stored in this tray are not to be indexed individually, the aforementioned numbering system is omitted from the flanges. In this construction I provide on the bottom of the tray four upstanding longitudinal ribs 42, these being spaced equally from one another and the outer ribs being spaced inwardly from the side walls 12 by half the distance between the ribs themselves. Beside and between the ribs, the bottom of the tray has a large number of upstanding studs or bosses 44 which conveniently may be circular in cross section. The purpose of these will be made clear presently, but it should perhaps be mentioned at this point that it is important for the bosses to be no higher than the ribs 42.

The slides filed in the tray stand on the ribs 42 so have their lower edges elevated slightly above the bottom of the tray as shown in Figs. 2 and 3, in a position to be free of engagement with the bosses. The slides are grouped according to subject matter and those in each group are placed in face to face serial relation without any substantial space therebetween. However, between adjacent groups I insert a thin metal separator 46, each of which has a pair of notches 46a extending upwardly from its lower edge in a position to register with a pair of the ribs 42 thereby to permit the lower edge of the separator to rest on the bottom of the tray and engage with the bosses 44.

The bosses are arranged in eight longitudinal rows, the respective rows being identified by the letters A, B, C . . . G, H in Fig. 3. In each row they are equally spaced along the length of the tray from one end to the other; however, the bosses in rows A, D, E, and H are staggered in position relative to those in rows B, C, F and G. Thus, as may best be seen in Fig. 1, the bosses in the two outermost rows and the two central rows (A, D, E and H) are aligned with one another transversely of the tray; those in the remaining rows (B, C, F and G) likewise are aligned transversely with each other, but in positions intermediate the positions of the bosses in the first mentioned rows.

Obviously any separator 46 can occupy an erect position straddling a pair of ribs 42 and engaging the bottom of the tray provided it is so located as to clear the bosses between and adjacent to the ribs. However, because of the staggered disposition of the bosses in the different longitudinal rows, there are only certain predetermined locations along each pair of ribs where the latter condition can be met, and in each of these locations when the separator is seated on the bottom of the tray, it will necessarily have a pair of bosses engaging its forward face along the lower edge thereof and a second pair engaging its rear face.

This is clearly illustrated in the case of separators 46' and 46" in Fig. 1, and the reason for same also will be readily understood from Fig. 4 where the dotted lines indicate four successive positions that can be occupied by the bottom edge of a separator. In all, there are approximately forty such positions along each pair of ribs 42 in a tray of the dimensions shown in Fig. 1. In each position the bosses engaging the forward and rear faces of the separator will serve to hold it upright. Attention is directed to the fact that each position is squarely at right angles to the ribs 42, it being absolutely impossible to insert a separator between the bosses if it is canted at an angle. Should an attempt be made to do the latter, the lower edge of the separator will rest on the top of one or more bosses preventing it from being advanced downwardly over the ribs and, having no means of support, it will topple over when released from the hand. This offers an automatic safeguard against improper insertion of the separators.

In the drawings the thickness of the separators 46 has been exaggerated somewhat for purposes of illustration. In actual practice they are thin enough to enjoy some play when properly inserted between the bosses as described above. This permits the upper edge of the seated separator to tilt forwardly or rearwardly a small amount and keeps the slides within a group positioned between any pair of separators from being held too tightly. Each separator preferably is provided with an upstanding tab 46b on which may be printed a legend indicating the subject matter of the associated group of slides, and tilting of the separators also facilitates inspection of these legends.

It is believed that the manner of using the filing tray shown in Figs. 1 to 4 will be relatively evident from the foregoing. In storing single width standard 35 mm. slides, they are positioned on either side of the longitudinal divider 30 or 31 as shown in the rear portion of the tray, being grouped according to subject matter as desired. Between adjacent groups a separator 46 is inserted, its lower edge being advanced downwardly between the appropriate pairs of bosses as described above. The different groups may differ from one another in the number of slides they contain, yet adjacent groups can be stored without any substantial gaps therebetween due to the flexibility of my arrangement for positioning the separators at a large number of different points along the length of the tray. Also it will be evident that the separators at the ends of any group of slides will support the slides in that group and hold them upright when an adjacent group is removed from the tray.

In storing double width "stereo" slides, essentially the same practice is followed except that the longitudinal divider is removed as shown in the forward section of the tray illustrated in Fig. 1. When this is done, it will be noted that any separator 46 can be mounted to straddle the two left-hand ribs 42, the two center ribs, or the two right-hand ribs, so that successive separators may be staggered for easy access and ready visibility of the legend at the tops thereof. Regardless of their staggered relationship, it should be understood that all separators engage with the locating and holding bosses 44 as outlined hereinbefore.

I prefer to make the separators 46 and the removable longitudinal dividers 30 and 31 of metal. Disregarding the slides themselves, these are the only parts that are removable from the tray proper, and I prefer to mold the entire tray in one piece regardless of whether the form shown in Figs. 1 to 4 or that shown in Figs. 5 and 6 be used. In the one-piece molded construction, a strong unit of perfect dimensional stability is obtained. Note, for example, that the flanges 12a not only perform the functions set forth earlier but also serve to reinforce the upper margins of the side walls 12, the lower margin of these walls being reinforced by the bottom of the tray itself; the bottom in turn is reinforced by the various ribs molded thereon, as well as by the central partition 26 and the end walls 14 and 16, all of the latter being strengthened by the various reinforcing bosses heretofore described. The resulting structure thus is not only attractive but very sturdy and durable.

From the foregoing it will be seen that this invention is one well adapted to attain all of the ends and objects hereinbefore set forth, together with other advantages which are obvious and which are inherent to the structure.

It will be understood that certain features and subcombinations are of utility and may be employed without reference to other features and subcombinations. This is contemplated by and is within the scope of the appended claim.

Inasmuch as various possible embodiments of the invention may be made without departing from the scope thereof, it is to be understood that all matter herein set forth or shown in the accompanying drawings is to be interpreted as illustrative and not in a limiting sense.

Having thus described my invention, I claim:

In a slide file for storing either single width or double width slides, a shallow tray having a rectangular bottom with upstanding side walls and front and rear walls, the side walls being spaced apart by a distance substantially equal to the length of said double width slides, said side walls having integral outwardly projecting flanges extending the full length thereof along their upper edges, said tray having a series of parallel ribs upstanding from the bottom thereof, said ribs extending transversely of the tray and being equally spaced along the length thereof, both of said flanges having serial indicia along their upper faces, the indicia of said series being at intervals coinciding with the spacing of said ribs, a plurality of partitions in said tray disposed end to end along the longitudinal center line of the tray, said partitions resting on the upper edges of said transverse ribs, and support means containing vertical slots to receive opposite ends of each partition whereby any selected one of the partitions can be shifted upwardly in its supporting slots to remove same from the tray without disturbing any other one of the partitions.

References Cited in the file of this patent

UNITED STATES PATENTS

| | | |
|---|---|---|
| 1,064,024 | Stimmel | June 10, 1913 |
| 1,385,885 | Norris | July 26, 1921 |
| 1,401,219 | Wheary | Dec. 27, 1921 |
| 1,479,632 | Stevens | Jan. 1, 1924 |
| 1,655,839 | Margeson | Jan. 10, 1928 |
| 1,894,445 | Huffman | Jan. 17, 1933 |
| 2,101,623 | Morgan | Dec. 7, 1937 |
| 2,507,366 | Budai | May 9, 1950 |
| 2,572,737 | Lehner | Oct. 23, 1951 |

FOREIGN PATENTS

| | | |
|---|---|---|
| 262,708 | Switzerland | Oct. 17, 1949 |
| 23,393 | Great Britain | 1912 |
| 24,278 of 1935 | Australia | Sept. 3, 1936 |